United States Patent
Reed

[15] 3,683,529
[45] Aug. 15, 1972

[54] HOLDER FOR LICENSE PLATES AND SIGNS

[72] Inventor: Ray Reed, 212 Arvada Ave. N.E., Albuquerque, N. Mex. 87107

[22] Filed: Aug. 14, 1970

[21] Appl. No.: 63,852

[52] U.S. Cl. ................................................. 40/209
[51] Int. Cl. .............................................. G09f 7/00
[58] Field of Search....40/209, 200, 142 A, 10, 10 A, 40/10 B

[56] References Cited

UNITED STATES PATENTS

| | | |
|---|---|---|
| 2,910,793 | 11/1959 | Helmer..........................40/209 |
| 3,168,787 | 2/1965 | Surrey..................40/142 A X |
| 3,237,327 | 3/1966 | Griggs............................40/10 |
| 3,422,556 | 1/1969 | Lyons et al...........40/142 A X |
| 3,430,376 | 4/1969 | Drybread.....................40/209 |

Primary Examiner—Robert W. Michell
Assistant Examiner—Wenceslao J. Contreras
Attorney—Cushman, Darby & Cushman

[57] ABSTRACT

A pliable, plastic plate having means secured to the front face for releasably holding a license plate or sign and having flexible, magnetically impregnated tape secured to the back face for holding the plate to metallic objects.

8 Claims, 4 Drawing Figures

Patented Aug. 15, 1972
3,683,529
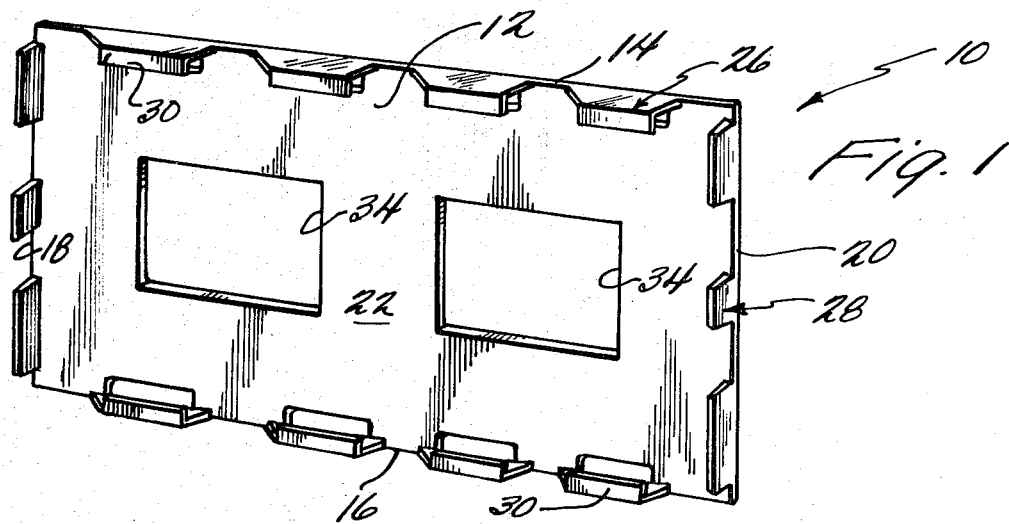
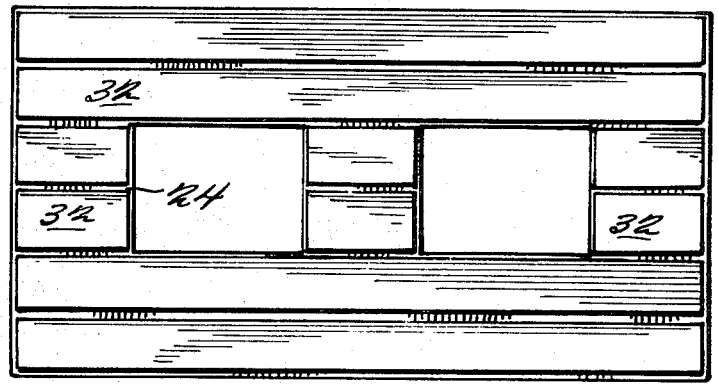
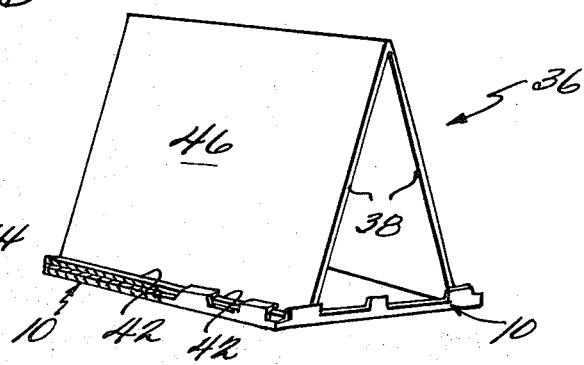
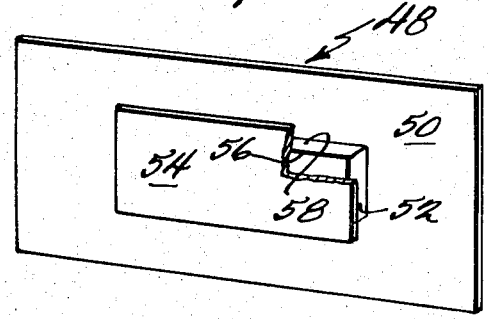
INVENTOR
RAY REED
BY
Cushman, Darby & Cushman
ATTORNEYS

HOLDER FOR LICENSE PLATES AND SIGNS

BACKGROUND OF THE INVENTION

This invention relates to a new and improved holder for vehicle license plates and other signs which is adapted to be secured to metallic supporting surfaces or objects.

It is common practice for automobile dealers to transfer license plates from one new car to another. It is desirable, therefore, to have a license plate holder which can be readily removed from an automobile and yet which securely holds the license plate on the even during a hard ride. Attempts have been made in the past to secure license plate holders to automobiles by means of magnets. However, these attempts have resulted in failure because the magnets would not stay fastened to the vehicle. Small magnets were not effective, and large magnets suffered the same defect due to the curvature of the automobile body. Finally, the use of magnets would occasionally mar the surface of the automobile.

SUMMARY OF INVENTION

The present invention provides a flexible, plastic holder or frame which allows the license plate to be easily inserted, and at the same time fits the curvature of the automobile body. The holder is fastened to the body with sufficient holding capacity to prevent accidental displacement during an occasional hard ride.

The frame member has flexible, magnetized strips of tape secured to its rear face. These strips maintain the frame's flexibility and allow it to conform to the curvature of an automobile body. At the same time, the magnetized strips of tape provide an effective means for securing the holder to a metallic surface.

While the holder is described principally in connection with the use of license plates, it is readily apparent that the holders could be used for any type of sign which might be secured to a metallic object. For instance, the flexibility of the frame and the magnetized strips of tape would enable the holder to be secured throughout its length to the curved metallic surface of an icebox or the like.

BRIEF DESCRIPTION OF DRAWINGS

FIG. 1 is a front perspective view of the holder;

FIG. 2 is a rear elevation view of the holder;

FIG. 3 is a perspective view of an easel inserted in the holder; and

FIG. 4 is a perspective view of another type of insert for the holder.

DESCRIPTION OF PREFERRED EMBODIMENTS

FIG. 1 discloses the holder 10 for license plates and other signs, not shown. The holder or frame comprises a four-sided, substantially flat, pliable plate 12 made of plastic material, such as high impact polystyrene. The plate is defined by upper and bottom parallel edges 14 and 16 and by parallel side edges 18 and 20, and has a front face 22 and a rear face 24 (see FIG. 2).

In order to hold the license plate or sign in the holder, a plurality of upwardly and inwardly projecting lugs 26 are positioned along the upper 14 and bottom 16 edges of the plate 12. Preferably, each lug is spaced from the adjacent lug in order to maintain the pliability of the plate. If the lugs were continuous across the top and bottom edges of the plate, it might reduce the pliability of the plate.

There is also provided a plurality of lugs 28 which are positioned along each side edge 18 and 20 of the plate and which likewise project upwardly from the front face 22 of the plate. These lugs are designed to insure that the license plate or sign does not slip out either end of the holder. The elimination of the inwardly projecting lug portion on the side lugs enables the license plate to be easily inserted in the holder. While three lugs 28 are shown in FIG. 1 along each side edge, it will be appreciated that only one lug, such as the middle one, is required to hold a license plate in the holder. On the other hand, the configuration of the sign or object positioned in the holder might require that the upwardly extending lugs 28 should be at least in partial alignment with the inwardly extending portion 30 of the lugs along the upper and lower edges. It will be appreciated that the design of the means for releasably holding the license plate or sign can take a variety of configurations. The design illustrated in the invention, however, is a typical and convenient design.

As illustrated in FIG. 2, flexible magnetically impregnated tape 32 is adhesively secured to the back face 24 of the plastic plate for securing the plate to metallic objects, not shown. Openings 34 through the plate enable the license plate or sign to be easily removed.

FIG. 3 discloses an easel insert 36 adapted to be releasably inserted in the holder. The easel 36 includes an inverted V-shaped member 38 in which the free legs 40 terminate in outwardly flared feet 42 adapted to be releasably fitted under the lugs 26 of the holder. For additional support a board 44 can be secured to the bottom surfaces of the outwardly flared feet 42 and likewise would be releasably fitted under the lugs 26. The easel enables signs to be placed on both sides 46 of the easel.

Likewise, FIG. 4 discloses a wall board 48 comprising a flat board 50 having a block 52 secured thereto and a retainer board 54 secured in turn to the block. The retainer board 54 overlaps one edge 56 of the block so as to define a groove 58 within which a sign can sit. The rectangular board 50 is designed to fit under the lugs 26 and to be retained in this position by the lugs 28 in the same manner that the license plate would be retained. The holder and wall board can be mounted vertically, as on a refrigerator, and have an appropriate sign supported thereby.

While the preferred form of the invention has been illustrated in the drawings and discussed above, it should be adequately clear that considerable modification may be made thereto without departing from the principles of the invention. Therefore, the foregoing should be considered in illustrative sense rather than a limiting sense, and accordingly the extent of this invention should be limited only by the spirit and scope of the claims appended hereto.

What is claimed is:

1. A holder for signs, such as license plates comprising:

a four-sided, substantially flat, pliable plate made of plastic material having upper and bottom parallel edges and parallel side edges and a front face;

means attached to the front face of the plastic plate for releasably holding a sign means, the holding means comprising at least a plurality of lugs projecting upwardly and inwardly from the front face along the upper and bottom edges of the plate, each lug along each edge being spaced from adjacent lugs along that edge to enhance the pliability of the plate; and flexible, magnetically impregnated tape secured to the back face of the plastic plate for holding the plate to metallic objects.

2. The holder defined in claim 1 wherein the holding means additionally comprises at least one lug positioned along each side edge of the plate and projecting upwardly from the front face of the plate.

3. The holder defined in claim 2 wherein the holding means additionally comprises a pair of lugs positioned along each side edge of the plate and extending upwardly from the front face of the plate, each upwardly extending side lug being at least partially in alignment with the inwardly extending portion of the lugs along the upper and lower edges.

4. The holder defined in claim 1 having means defining an opening through the plate for enabling the license plate to be easily removed.

5. The holder defined in claim 1 wherein the plastic material comprises high impact polystyrene.

6. The holder defined in claim 1 additionally comprising an easel including an inverted V-shaped member, the free ends of the legs of the V-shaped member terminating in outwardly flared feet releasably fitted under the holding means.

7. The holder defined in claim 6 additionally comprising a flat board secured to the bottom surfaces of the outwardly flared feet and releasably fitted under the holding means.

8. The holder defined in claim 1 additionally comprising a wall board including a flat board releasably fitted under the holding means, a block member secured to the board, and a retainer secured to and overlapping one edge of the block so as to cooperate with the flat board and block to define a groove having its bottom formed by the block and adapted to receive a sign means when the surface of the block defining the groove is placed to face upwardly.

* * * * *